United States Patent
Farrell et al.

(10) Patent No.: US 10,171,769 B2
(45) Date of Patent: *Jan. 1, 2019

(54) SOUND SOURCE SELECTION FOR AURAL INTEREST

(71) Applicant: International Business Machines Corporation, Armonk, NY (US)

(72) Inventors: Robert G. Farrell, Cornwall, NY (US); James R. Kozloski, New Fairfield, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/626,193

(22) Filed: Jun. 19, 2017

(65) Prior Publication Data

US 2017/0289495 A1 Oct. 5, 2017

Related U.S. Application Data

(63) Continuation of application No. 14/485,157, filed on Sep. 12, 2014, now Pat. No. 9,693,009.

(51) Int. Cl.
*H04N 5/77* (2006.01)
*H04N 9/82* (2006.01)

(52) U.S. Cl.
CPC ............ *H04N 5/77* (2013.01); *H04N 9/8211* (2013.01)

(58) Field of Classification Search
CPC .............................. H04N 5/77; H04N 9/8211
See application file for complete search history.

(56) References Cited

U.S. PATENT DOCUMENTS

| | | | |
|---|---|---|---|
| 6,141,034 A | 10/2000 | McCutchen |
| 8,130,978 B2 | 3/2012 | Sun |
| 2003/0117527 A1 | 6/2003 | Smith |
| 2003/0160862 A1 | 8/2003 | Charlier |
| 2004/0037436 A1 | 2/2004 | Rui |

(Continued)

FOREIGN PATENT DOCUMENTS

| | | |
|---|---|---|
| EP | 2324645 B1 | 2/2012 |
| WO | PCT-2007031906 A2 | 3/2007 |

(Continued)

OTHER PUBLICATIONS

"3D projection" Wikipedia, the free encyclopedia, page last modified on Oct. 13, 2013 at 07:19. <http://en.wikipedia.org/wiki/3D_projection>.

(Continued)

*Primary Examiner* — Hung Q Dang
*Assistant Examiner* — Sunghyoun Park
(74) *Attorney, Agent, or Firm* — Stephen R. Yoder

(57) ABSTRACT

A viewer-selectable audio display region is associated with certain pixels of a video feed visible to the viewer of the video. Directional microphones provide audio signals for specific audio sources within a three-dimensional (3-D) video recording space. The recorded video signal is augmented with the audio signals and identified sound sources. The sound sources are mapped to pixels on the display. When the viewer selects the pixels, one or more audio recordings are: (i) played; (ii) amplified; (iii) mixed; and/or (iv) otherwise processed.

20 Claims, 4 Drawing Sheets

(56) References Cited

U.S. PATENT DOCUMENTS

| | | | |
|---|---|---|---|
| 2007/0162839 A1* | 7/2007 | Danty | G06F 17/30056 715/203 |
| 2007/0216807 A1 | 9/2007 | Otsuka | |
| 2008/0163379 A1 | 7/2008 | Robinson | |
| 2008/0276270 A1 | 11/2008 | Kotaru | |
| 2009/0252379 A1 | 10/2009 | Kondo | |
| 2010/0154065 A1 | 6/2010 | Cohen | |
| 2010/0265399 A1 | 10/2010 | Inoue | |
| 2012/0007801 A1 | 1/2012 | Banning | |
| 2012/0124602 A1 | 5/2012 | Tan | |
| 2013/0160052 A1 | 6/2013 | Ure | |
| 2013/0232430 A1 | 9/2013 | Reitan | |
| 2013/0315404 A1 | 11/2013 | Goldfeder | |
| 2013/0342731 A1* | 12/2013 | Lee | H04N 5/23293 348/231.4 |
| 2014/0143725 A1* | 5/2014 | Lee | G06F 17/30017 715/834 |
| 2014/0362253 A1 | 12/2014 | Kim | |
| 2014/0365913 A1* | 12/2014 | Santamaria | G06F 3/016 715/748 |
| 2014/0369506 A1 | 12/2014 | Arrasvuori | |
| 2015/0228309 A1 | 8/2015 | Bartlow | |
| 2016/0071524 A1* | 3/2016 | Tammi | H04N 5/77 386/343 |
| 2016/0080684 A1 | 3/2016 | Farrell | |
| 2016/0249134 A1 | 8/2016 | Wang | |

FOREIGN PATENT DOCUMENTS

| | | | |
|---|---|---|---|
| WO | PCT-2010017966 | A1 | 2/2010 |
| WO | PCT-2010022453 | A1 | 3/2010 |
| WO | PCT-2012158407 | A1 | 11/2012 |

OTHER PUBLICATIONS

"Cocktail party effect" Wikipedia the free encyclopedia, page last modified on Oct. 17, 2013 at 9:41. <http:en//wikipedia.org/wiki/Cocktail_party-effect>.

Beaudouin-Lafon et al. "ENO: Synthesizing Structured Sound Spaces". UIST '94 Proceedings of the 7th Annual ACM Symposium on User Interface Software and Technology. Nov. 2-4, 1994. pp. 49-57. New York, NY USA.

Cohen et al. "Augmented Audio Reality: Telepresence/VR Hybrid Acoustic Environments" 2nd IEEE International Workshop on Robot and Human Communication. Nov. 3-5, 1993. pp. 361-364. Tokyo.

Cohen et al. "Multidimensional audio window management", Int. J. Man-Machine Studies (1991) 34, pp. 319-336. Copyright 1991 Academic Press Limited.

Meier et al. "3D VIVANT-Deliverable 3.10 3D Audio Content Generation" ICT Project Contract No. 248420. 1st Draft Aug. 26, 2011, Final Version Oct. 13, 2011. pp. 1-40.

Mrazovac et al "Smart Audio/Video Playback Control Based on Presence Detection and User Localization in Home Environment" 2011 Second Eastern European Regional Conference on the Engineering of Computer Based Systems, Copyright 2011. pp. 44-53.

Schmandt. "Audio Hallway: a Virtual Acoustic Environment for Browsing". UIST '98 Proceeding of the 11th annual ACM symposium on User interface software and technology, San Francisco, CA pp. 163-170. Copyright 1998 ACM.

Appendix P List of IBM Patents or Applications Treated as Related Dated Jun. 19, 2017. Two pages.

Original U.S. Appl. No. 14/485,157, filed Sep. 12, 2014.

* cited by examiner

SOUND SOURCE SELECTION FOR AURAL INTEREST

FIELD OF THE INVENTION

The present invention relates generally to the field of audio-visual displays, and more particularly to audio signal processing.

BACKGROUND OF THE INVENTION

The cocktail party effect is the phenomenon of being able to focus one's auditory attention on a particular stimulus while filtering out a range of other stimuli, much the same way a partygoer can focus on a single conversation in a noisy room. This effect is what allows most people to hear a single voice from among many voices being heard at the same time.

Surround sound is a technique for enriching the sound reproduction quality of a sound source with additional audio channels from speakers that surround the listener, known as surround channels, providing sound from a 360 degree radius in the horizontal two-dimensional plane. Surround sound is characterized by a listener location where the audio effects are best combined. The surround sound technique enhances the perception of sound spatialization by exploiting a listener's ability to identify the location or origin of a detected sound in direction and distance. Typically surround sound is achieved by using multiple discrete audio channels routed to an array of loudspeakers.

A parabolic microphone is a microphone that uses a parabolic reflector to collect and focus sound waves onto a receiver, in much the same way that a parabolic antenna (e.g., satellite dish) does with radio waves. A parabolic microphone is one example of a directional microphone. More specifically, a directional microphone is designed to receive sound from a particular direction, while a parabolic microphone acts to amplify sounds at a distance from that direction.

Three-dimensional projection is any method of mapping three-dimensional points to a two-dimensional plane. Because many methods for displaying graphical data are based on planar two-dimensional media, the use of three-dimensional projection is quite common, especially in computer graphics, engineering, and drafting. One way to understand the mechanics of a perspective projection is to imagine the two-dimensional projection as though the object(s) are being viewed through a camera viewfinder. The camera's position, orientation, and field of view each control the behavior of the projection transformation.

SUMMARY

In one aspect of the present invention, a method, a computer program product, and a system for providing viewer-selectable audio in a video includes: modifying a video recording by adding to the video recording a viewer-selectable region of a video display plane corresponding to a sub-set of pixels within a set of pixels displayed during playback of the video recording, the viewer-selectable region corresponding to a first sound source recorded by at least one microphone of a plurality of microphones from a three-dimensional scene, and adjusting an audio signal played by the modified video recording based, at least in part, upon selection of the viewer-selectable region during playback of the modified video recording. The at least one microphone records audio from the first sound source on an audio channel that is distinct from the audio channels of other microphones of the plurality of microphones. Selection of the viewer-selectable region plays an audio recording made by the at least one microphone corresponding to the first sound source.

DETAILED DESCRIPTION

Figure 1:
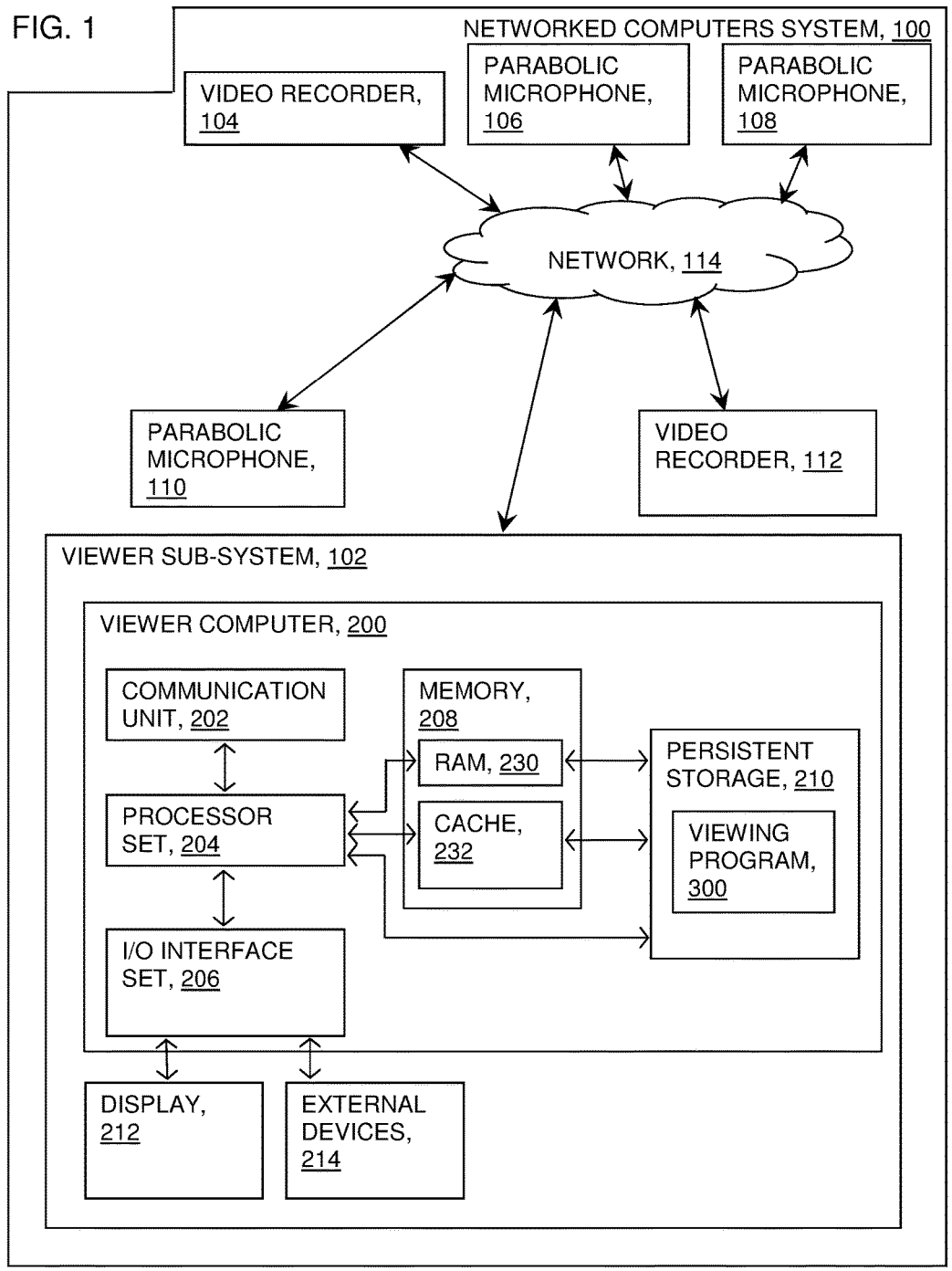
FIG. 1 is a schematic view of a first embodiment of a computer system (that is, a system including one or more processing devices) according to the present invention.

A viewer-selectable audio display region is associated with certain pixels of a video feed visible to the viewer of the video. Directional microphones provide audio signals for specific audio sources within a three-dimensional (3-D) video recording space. The recorded video signal is augmented with the audio signals and identified sound sources. The sound sources are mapped to pixels on the display. When the viewer selects the pixels, one or more audio recordings are: (i) played; (ii) amplified; (iii) mixed; and/or (iv) otherwise processed. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: viewer sub-system 102; video recorder sub-systems 104, 112; parabolic microphone sub-systems 106, 108, 110; communication network 114; viewer computer 200; communication unit 202; processor set 204; input/output (I/O) interface set 206; memory device 208; persistent storage device 210; display device 212; external device set 214; random access memory (RAM) devices 230; cache memory device 232; and viewing program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Viewing program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Viewing program 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Viewing program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with viewer computer 200. For example, I/O interface set 206 provides a connection to external devices 214. External devices 214 will typically include devices such as a keyboard, keypad, a touch screen, and/or some other suitable input device. External devices 214 can also include portable computer readable storage media such as, for example, thumb drives, portable optical or magnetic disks, and memory cards. Software and data used to practice embodiments of the present invention, for example, viewing program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display 212 provides a mechanism to display data to a user and may be, for example, a computer monitor or a smart phone display screen.

Parabolic microphone sub-systems 106, 108, and 110 may each have a unique focus point. In that way, as described more detail below, multiple sound locations may be presented to the viewer for customizing audio playback characteristics of the video playback.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Viewing program 300 enables a user/viewer to control the audio played, audio mix, and/or audio processing performed while viewing a video. The sound source is the location within the 3-D space of the scene from where the sound is emanating. The viewer controls which sound source(s) are played and/or to what extent, or at what volume the audio for each sound source is played, or to what extent other audio processing (e.g. reverb, planging, phase, pitch shift, chorus, sampling, recording/storing). This will be discussed in more detail below, the selection of the sound source(s) audio mix is made by selecting a pixel field being displayed that is associated with a particular sound source.

The pixel field for the audio of a sound source is referred to herein as an "auxel," combining the terms "audio" and "pixel." For a complete definition of an "auxel," see the definition in the definition section below. The associated pixels do not have to be employed within the display of the sound source, but in some embodiments of the present invention the display of the sound source uses at least some of the pixels making up the "auxel." Accordingly, a recording and/or presentation of an event, such as a sporting event, a news program, or concert, is provided such that viewers of the video individually choose the sound source(s) for the audio of the video presentation that each user is viewing. An event may be recorded with two or more microphones having different microphone targets, or sound sources, within a three-dimensional space. Then, the 3-D locations of the sound sources are projected onto the two-dimensional plane of the video display to produce audio display regions within the video display. Given the location of a microphone (e.g. from a global position system) and the pitch and yaw (e.g. from a gyroscope sensor), the directional line of the microphone to a potential sound source can be computed. Then, a user may select an auxel within the video display, for example, via a pointing device, and the audio presented to the user is based on sound sources relative to the auxels selected by the user. In that way, the user selects which sound source they want to listen to from the streaming or otherwise displayed video. The discussion herein refers to multiple sound sources, generally with a 1:1 ratio of microphones to sound sources. A single microphone may be used in some embodiments of the present invention, however, for a better understanding of the disclosure, multiple sound sources will often be illustrated.

Some embodiments of the present invention provide for the user to select one or more pixels of the displayed scene. Further, the user may be free to select any pixels on a display device and the system will compute the corresponding auxels and perform some type of audio processing. The user may use a pointing device that selects many pixels and, thus, overlap many audio display regions that are then mixed or processed to product the sounds that the user hears. Note that because the pixels are 2-D and the scene is 3-D, a 3-D projection is used, so it is ambiguous as to which sound source is selected. When a user selects a pixel, or pixels, within an audio display region, all sound sources that were projected to the selected pixel are played. For example, if the user selects an area with a man talking and fireworks in the background, if the pixel region selected by the user is large enough, it will end up overlapping both the "man talking" audio and the "fireworks exploding" audio, so both sounds will be controlled (played/mixed).

Some embodiments of the present invention recognize the following facts, potential problems and/or potential areas for improvement with respect to the current state of the art: (i) in a television show or other live broadcast, normally the viewer hears one audio mix of various sound sources, but really there are multiple audio channels all being sent in parallel and usually limited by the number of channels available for surround sound; (ii) despite the existing use of multiple sound source recordings in a single video recording and/or broadcast, a viewer's interests may not correspond to the primary sound selection during a given video segment; (iii) just as a viewer's eye may focus on certain images while viewing of a given video segment on a display screen, a viewer may wish focus auditory attention to certain sound sources while viewing a video segment (for example, a viewer may want to focus on the cries of the audience instead of the host in football broadcast); (iv) the human auditory sense rarely integrates multiple sound sources into a single object as the human vision sense does when viewing multiple objects; (v) the human auditory sense processes multiple sound sources in parallel; (vi) the sound mixing performed by the human auditory sense is under the control, at least in part, by the attention and volition of the listener as demonstrated by the cocktail party effect; (vii) microphones, performing the sound mixing function for the viewer, strip away cues that could otherwise be used by the human auditory sense to shift auditory attention based on their directional nature; and/or (viii) microphones are naturally monaural and filter out various properties of the sound being reproduced such that the user's ability to interact with the sound environment is severely limited and unnatural.

Some embodiments of the present invention recognize the following facts, potential problems and/or potential areas for improvement with respect to the current state of the art: (i) the sound source of interest may be outside the video viewing area (for example, the sound of the crowd may be quite muffled in the background); (ii) there are a fixed number of channels of audio transmitted (such as 24); (iii) when using the concept of auxels, it may be possible that there will be too few audio channels available; and/or (iv) in a crowd-based video recording situation where multiple amateur videographers using, for example, cell phones and/or hand-held video cameras, many sources of audio and/or video may be captured.

The systems that record, transmit, and amplify different sound sources are presented herein as various embodiments of the present disclosure. There are often multiple sources of interesting sound corresponding to different locations in a video image whether live or pre-recorded broadcasts such as: (i) television shows; (ii) stadium events with live audiences/spectators; (iii) news programs; and (iv) nature documentaries. Typically, control is switched from one sound source to another during live mixing performed "in the booth" as displayed video images change from the perspective of one camera to that of another at a video segment boundary.

Some embodiments of the present disclosure allow a viewer to experience natural sound selection capability for sound sources associated with a set of image regions, "audio spots," or "auxels," during video playback by providing technology having one or more of the following functions in an integrated system: (i) a method for recording multiple sound sources simultaneously during a single video image recording (the solution requires multiple microphones per video lens to achieve this, and one embodiment makes use of a bank of parabolic microphones pointed at the field of view captured by the camera); (ii) a user interface for selecting from among a multiplicity of recorded sound sources in a segment; (iii) a method for smoothing the auditory transition from one auxel to another (for example, using binaural cues, and dynamic mixing of sources); (iv) the method can be extended to give a more embodied and powerful feeling by coupling functions (i) and (ii) to measures of eye/head movements (this augmentation gives rise to a profound illusion of having "bionic ears" as the user experiences an "auditory zoom" effect as they, for example, tilt their head); (v) very large displays further support the illusion of auditory zoom because the necessary head and eye movements would be exaggerated; (vi) detection of the distance between the video playback to use as a volume control per auxel, making it possible to step forward to hear something; and/or (vii) detection of hand movements, making it possible to hold ones hand up to a set of pixels to silence them (selective muting). An "audio spot" is one example of an audio display region. For a definition of "audio display region," see the definitions section below.

Some embodiments of the present disclosure include one, or more, of the following method steps: (i) start recording a single scene using two or more microphones and one video camera lens, each microphone focused on a different region of three-dimensional space being recorded; (ii) identify the 3-D position or space in which each directional microphone is focused and the 3-D position of the center of the video lens relative to one another (this could be done by mounting the microphones on the camera and knowing the properties of the microphones); (iii) project the audio focus of each microphone onto the two dimensional video display plane; (iv) identify auxels, or audio spots, on the video display plane for each microphone; (v) accept a selection of one or more of the audio spots (for example, from a pointer); (v) weight the audio spots (for example, by boosting the selected one(s)); (vi) mix the sound sources transmitted with the video so as to make a change in the sound properties (such as loudness, on/off, etc.) to route to the amplifiers and speakers; (vii) make private sound selection (for public environments) using pointing devices such as personal eye trackers (for example, those used in personal heads-up, eyeglasses-type interfaces); (viii) start recording a single scene using a bank of directional, parabolic microphones, which have a database associated with them (this may be combined with steps (iii), (iv), (v), and/or (vi); (ix) identify audio spots while making use of other camera angles to permit the construction of a 3-D model of the space being filmed (from this model, the sound line terminations at a sound source may be calculated based on where in 3-D space the lines intersect a real world 3-D object); (x) the use of object recognition technology allows for sound sources to be associated with annotated video automatically, wherein a label corresponding to the real world object in the video image is also associated with one of a variety of sound sources based on this analysis; (xi) correlation analysis of sound sources and segmented videos (for example, detection that one person in a video is the source of a sound based on digital lip-reading); (xii) modify the video image in response to a sound source selection so that a user has immediate feedback that a source is selected; and/or (xiii) changing the hue or contrast of an audio display region, or additional annotations or highlights in response to the selection of a sound source.

Figure 2:
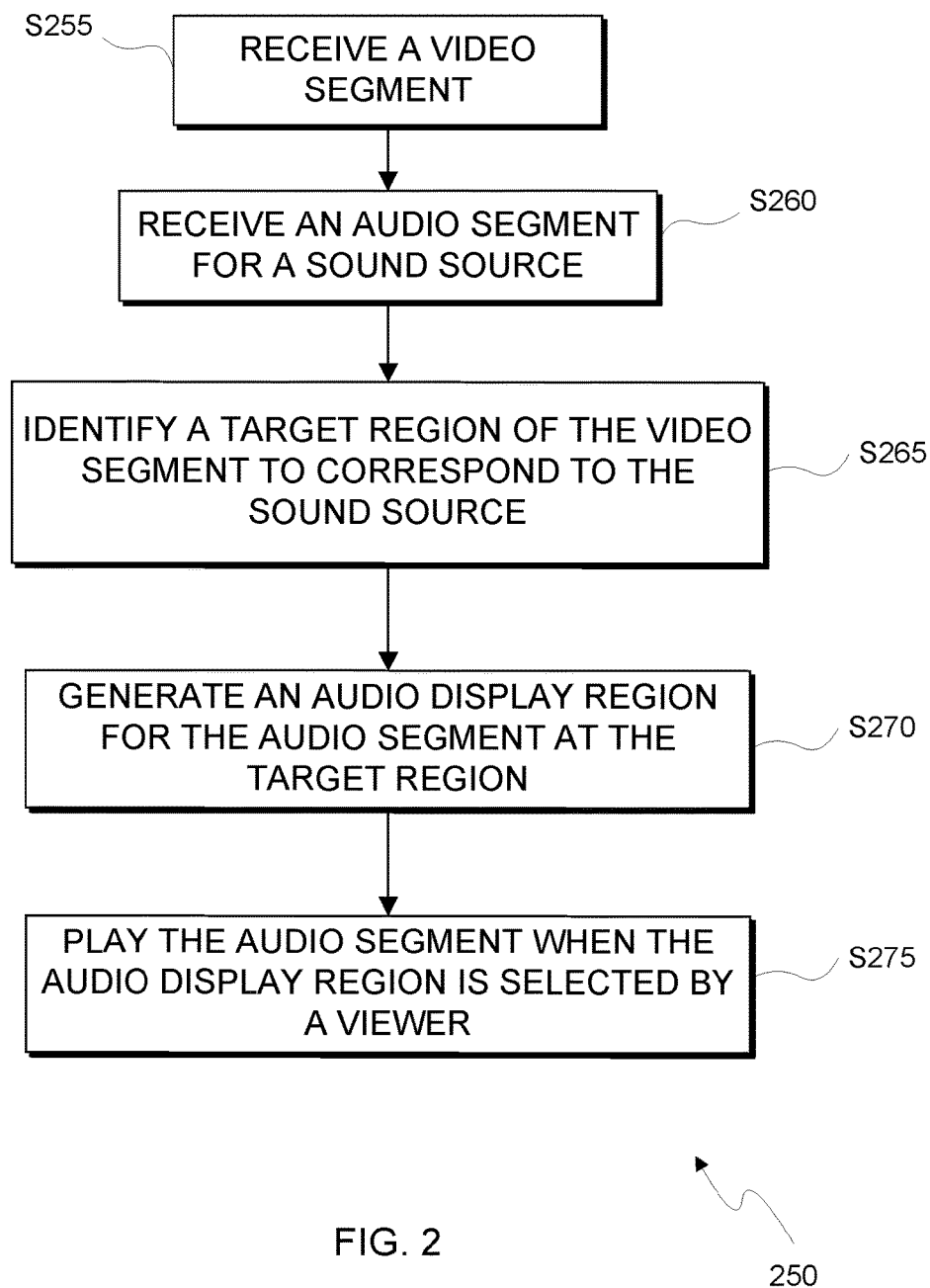
FIG. 2 is a flowchart showing a process performed, at least in part, by the first embodiment computer system.
Figure 3:
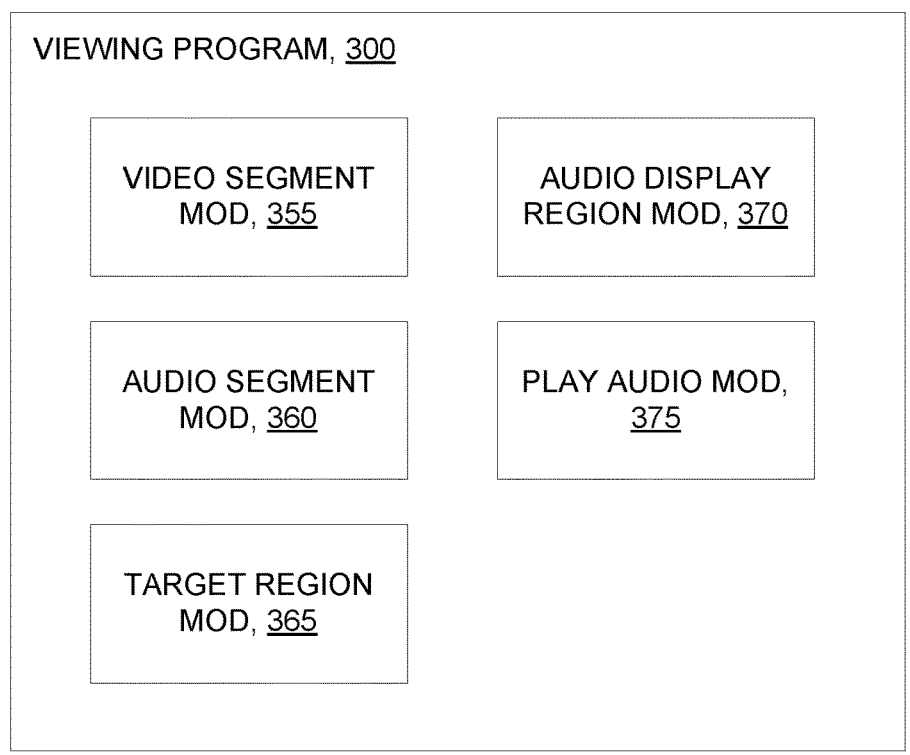
FIG. 3 is a schematic view of a computer sub-system (that is, a part of the computer system that itself includes a processing device) portion of the first embodiment computer system.

FIG. 2 shows flowchart 250 depicting a first method according to the present invention. FIG. 3 shows viewing program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where video segment module 355 receives a video segment. In this example, the video segment is received from video recorder 104 over network 114 (FIG. 1). Alternatively, the video segment module operates within a video camera device and the video segment is received from the video camera while the video segment is being generated. Alternatively, a pre-recorded video segment is received by the video segment module from a storage device (not shown).

Processing proceeds to step S260, where audio segment module 360 receives an audio segment for a sound source. In this example, the audio segment is provided by parabolic microphone 106 over network 114 (FIG. 1). Alternatively, a microphone is included in the video camera device having the audio segment module. The microphone provides the audio segment module with the audio segment as the audio segment is generated. Alternatively, a pre-recorded audio segment is received by the audio segment module from a storage device (not shown). In this example, the audio segment is indexed to the video segment, such that simultaneous playback of the two segments is synchronized. While the steps S255 and S260 are discussed in order, as a sequence, the two steps may be performed in reversed order or even as parallel operations.

Processing proceeds to step S265, where target region module 365 identifies a target region within the video segment display that will correspond to the sound source in the audio segment. The video segment is presentable in a two-dimensional display screen where the image is made up of pixels. The target region is a pixel field of at least one pixel that is selected to correspond to the sound source. In this embodiment, the target region corresponds to the pixels making up at least a portion of the video image of the sound source itself. Alternatively, the target region is a designated region of the video display associated with one, or more sound sources. Alternatively, the target region is selected based on design considerations, such as marketing strategy, producer's preference, etc.

Processing proceeds to step S270, where audio display region module 370 generates an audio display region for the playback of the audio segment at the target region. As will be discussed in more detail below, the audio display region is a selectable region within the video display that corresponds to the playback of one, or more audio segments or channels. In some embodiments of the present invention, each audio segment represents a unique audio channel with respect to any other available audio segments. Further, the audio picked up by an audio receiver, such as parabolic microphone 106, is associated with a single audio channel.

Processing ends at step S275, where play audio module 375 plays the audio segment when at least one of the pixels in the audio display region is selected by a viewer. Because audio display regions may overlap, pixel selection may overlap with more than one audio display region. Various rules may be defined for triggering audio display regions. For example, the majority of the pixels in the audio display region might have to overlap with the pixels selected by the user. In this example, the audio segment is played back in audible form upon viewer selection. Alternatively, play back is performed through closed caption display or other audio-to-text service. Additionally, factors including the distance between the user's pointer, when projected into the 3-D scene, and the nearest audio sources in the 3-D scene can be applied by the play audio module to mix the sound sources according to an auditory model, such as the sound volume decreasing with distance to the source. The source model can be more sophisticated with knowledge of the specifics of the scene. For example, the acoustic model of a hall could be used. Additional details and features of this disclosure are provided below.

Figure 4:
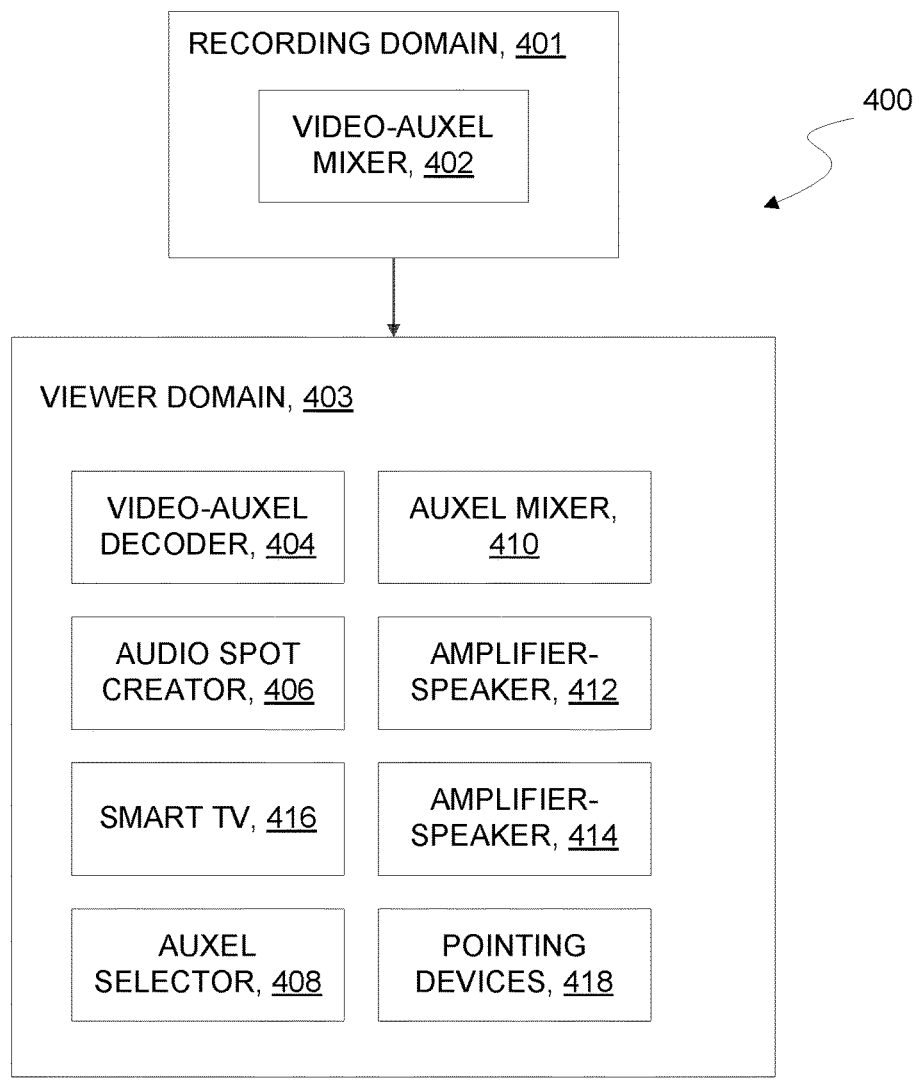
FIG. 4 is a block diagram view of a second embodiment of a system according to the present invention.

FIG. 4 is a functional block diagram illustrating various portions of home entertainment system 400, in accordance with one embodiment of the present invention, including: recording domain 401; video-auxel mixer module 402; viewer domain 403; video-auxel decoder 404; audiospot creator 406; auxel selector 408; auxel mixer 410; amplifier-speaker sub-systems 412 and 414; smart television 416; and pointing devices 418.

The use case that follows will be referred to during a discussion of the process steps associated with FIG. 4. A sporting event is being recorded for video playback with video recorders and for audio playback with parabolic microphones. The recording devices are network connected such that the images and sound recordings are received by a central processing unit. In this example, the sporting event is a baseball game. Each parabolic microphone is setup to record a particular sound source, whether an object, person, or location, produced at the game, such as home plate umpire, pitcher's mound, first base, second base, third base, or the home team's dugout. In the example that follows, a live streaming audio/video feed is processed during live playback.

At a certain point in time, the camera is positioned to view first, second, and third bases in one shot. A first user is sitting at home enjoying the baseball game. The first user becomes interested in a baseball player who just ran to first base. The first user directs their pointer at the video showing the first base and hears the player talking. A second user is sitting at home enjoying the baseball game. The second user becomes interested in the short stop player, but because the nearest parabolic microphones are set up for second and third bases (the short stop position is between the two bases), when the second user directs their pointer at the short stop player, they get a low volume mix of both the sounds at second based and at third base.

Video-auxel mixer 402 combines the video feed and corresponding audio feeds to create a video-auxel data set. The video-auxel mixer synchronizes the various audio feeds with the video feed. While a single audio recorder may be used, a microphone array enhances the sensitivity of the disclosed system and may be used to filter incoming sound to focus on a selected area.

Video-auxel decoder 404 identifies pixels in the video scene as potential sound sources. This can be performed using the focus points provided in the video-auxel data set. Alternatively, a 3-D model of the recorded space can be used to identify sound sources as objects, people, and/or places (using object recognition and scene analysis). Given the location and the focus points of the microphones and the 3-D model, the video-auxel decoder can infer that certain sound sources are coming from specific objects in the video scene. Some embodiments of the present invention use input from one, or more, users to identify sound sources in the video display. The completed 3-D model and labels for sound sources is part of a decoded video-auxel data set.

Audio spot creator 406 projects the 3-D model produced by the decoder onto a display such that the specific pixels of the video display are associated with specific sound sources according to the decoded video-auxel data set. The audio spot creator creates a mapping from pixels to audio sources. If no object recognition and scene analysis is performed, then the audio spot creator maps pixels to particular audio channels from particular microphones by using the projection of the focus point onto the diplay, enabling audio channels to be selectable via user input. For example, input may be provided by a pointing device or other remote control device. Other possible pointing mechanisms include: (i) mouse; (ii) touch screen; (iii) gesture recognition; (iv) pen; (v) data glove; (vi) touchpad; (vii) stylus; (viii) joystick; (ix) trackball; (x) light pen; (xi) haptics; (xii) eye direction tracking; (xiii) gaze direction tracking; and (xiv) other UI input devices now know of to be known in the future. Auxels, which may be referred to as scene/object elements that are a sound source, are mapped to a two-dimensional video image display. In this example, each audio channel is associated with a particular audio recording from a particular directional microphone. It should be noted that each video recording may be recorded simultaneously and the same audio recording may be associated with more than one video image. In that case, the audio spot for each audio recording will likely be located in a different region of each video recording.

Smart TV 416 is the display device used to present the video image. It is the smart TV display that is referred to herein as the 2-D display, or plane of the video image. That is, a viewer selects an auxel shown on the smart TV to select a particular sound source or mix of sound sources. Selection of an auxel is accomplished through pointing devices 418. Any device 418 such as a mouse or other remote control device may operate to select an auxel.

Auxel selector 408 operates to receive input from pointing devices 418 and determine which auxel is being selected. The Auxel selector works with Auxel mixer 410 to present the selected audio, whether coming from a single sound source or a mix of sound sources. In this example, the selection of a sound source is computed by relating a user indication to the projection of the sound source in a 3-D scene onto a 2-D video display. The selection of sound is within auxels made up of pixels within the displayed video image. Where multiple auxels are selected, auxel mixer 410 mixes the selected auxels for playback through amplifier-speakers 412 and/or 414.

In some embodiments of the present invention, the auxel mixer determines what weight, if any, to give to the multiple sound sources based on the location within each auxel that the selection is made. That is, each selected auxel is weighted according to the proximity of the user-selected location to the sound source and/or auxel. Alternatively, the user is provided a user interface for setting the relative weight (of intensity) of a particular auxel from among the selected auxels. Some embodiments of the present invention operate to smooth the auditory transition from one auxel to another as the user's selection device moves along the display screen, for example, using binaural cues, and dynamic mixing of sources. Additionally, some embodiments of the present invention provide for detection of the distance of listener from the video playback location. The detected distance acts as a volume control per auxel, making it possible to step forward to hear something. Further, some embodiments of the present invention provide for muting a particular auxel. For example, when a user's hand movements indicate that the user is holding a hand up in the direction of a set of pixels, the corresponding auxel(s) will be muted.

Some embodiments of the present invention provide for manipulating the sonic qualities of a first audio signal when one auxel is selected, thus allowing a user to select a pixel field or "audio spot" and automatically trigger the proper audio mixing from multiple sound sources in 3-D. For example, if the user selects on the display screen an auxel that appears to be in a zoo just outside a tiger's cage, with a lion in a cage next door, and if there is a directional microphone pointed at the tiger, the auxel mixer can model the nearby 3-D sound sources and mix them to give the illusion of the user being located at that spot. That is, the tiger will be fairly loud and the lion, next door, will be heard as a softer sound.

Some embodiments of the present invention perform one, of more, of the following steps: (i) select a first and a second pixel field of a video display during the playing of a single video segment; (ii) identify at least two audio signals during the playing of said video segment; (iii) link a first audio signal with the first pixel field of the video display and the second audio signal with the second pixel field of the video display; (iv) where first and second audio signals are not identical and the first and second pixel fields of the video display do not share all of their pixels, manipulate the sonic qualities of the first audio signal when the first pixel field is selected and the second pixel field is not selected and manipulate the sonic qualities of the second audio signal when the second pixel field is selected and the first pixel field is not selected.

Some embodiments of the present invention project the focus of a microphone that is recording audio of a scene onto the plane of a video recording of the same scene to compute an auxel and utilize the positions of the microphones and video recordings. The focus of a microphone depends upon the type of microphone and the sound's source. For example, shotgun microphones are different from parabolic microphones in their ability to collect sound. A loud noise far away from the microphone may be picked up at the same volume as a soft noise close to the microphone. Accordingly, the focus incorporates two things: (i) the distance from the microphone; and (ii) the orientation of the microphone (yaw angle and pitch angle). This concept works better with an accurate distance. In this example, the recommended usage distance as provided by the microphone manufacturer is used. For a parabolic microphone, the direction of sound collection is quite accurate, establishing an audio line into the 3-D scene. Some embodiments of the present invention describe the use of a model of the 3-D scene to locate the point of intersection of the established microphone line with an object, which is then presumed to be the sound source. The distance is measured from the microphone to the object along the established microphone line. The microphone line may also be used to identify the same object in the plane of a video display by performing a perspective projection of the camera into the same space until the point along the microphone's line at a specified distance is encountered.

Some embodiments of the present invention map a 3-D audio recording to a 2-D plane of the video recording by determining the following information: (i) where the video camera lens is and where it is pointed (length, width, pitch, yaw); (ii) where the various microphones are located relative to the video camera (for the purposes of the embodiment it can be assumed that they are at the same location as the video camera lens (under and/or over it); and (iii) in which direction the camera lens and microphone are pointed. When this information is determined, perspective projection is performed and the 2-D plane of the video recording is mapped to the 2D plane of the video display using a scaling factor. The 2-D plane of the video display is simply the height and width in pixels (e.g., 1920×1080).

Some embodiments of the present invention account for the view of the video recorder changing with time as the action is followed by the viewfinder. For such cases, the above procedure is performed repeatedly for each moment in time the microphone's recording line is mapped into the video space recorded by the camera. That is, the corresponding pixel location coordinates in the recorded, or displayed, image are mapped for the likely sound source.

Some embodiments of the present invention account for movement of the directional microphone(s). As the microphone's recording lines change, due to movement of the microphone, the object sources for the recorded sound change their x, y location with respect to the video image(s). For such cases, the above procedure is performed repeatedly for each moment in time the microphone's recording line is mapped into the video space recorded by the camera. That is, the coordinates of the likely sound source are tracked with respect to the recorded, or displayed, image.

In addition, the objects in a scene may be moving. For example, a lion may be roaring and moving around as it is recorded by the video camera. Typically the microphone operator will try to direct the microphone(s) at the lion's roar, but the attempt is not always perfect. To the extent that the sound sources are located differently than the location that the directional microphones are pointing and are focused, the audio spots generated by some embodiments of the present invention will not be accurately represented on, for example, a video display.

Some embodiments of the present invention address the above-mentioned inaccuracy by turning off any microphones that aren't picking up the sound source, thus making each audio spot bigger. Alternatively, this inaccuracy is address by geo-locating the sound sources.

Some embodiments of the present invention provide for cases where the sound source and/or the microphone focus move out of the video display. In such a case, the audio spot may be removed from that image. Alternatively, the user is permitted to "turn toward" the audio.

Some embodiments of the present invention provide a method of recording and playing a video of a scene while providing viewer selectable audio during playback including the steps that follow. Recording a video of a 3-D scene using a video camera and at least one microphone, each microphone having a focus point within the scene and each microphone's audio signal recorded on a separate audio channel. Determining the 3-D location of the microphone focus points with respect to the location of the video recording within the 3-D scene. Projecting the 3-D microphone focus points onto the 2-D plane of the video recording to yield audio display regions in the video recording each region corresponding to one, or more, audio channels. Transmitting the projected audio display regions corresponding to audio channels with the video recording to a video display. Identifying areas of the video display as audio spots, each audio spot containing at least one of the audio display regions. Receiving a selection of one or more audio spots. Changing the audio signal on the audio channels corresponding to said audio points.

Some embodiments of the present invention provide a method for providing viewer-selectable audio in a video including the steps that follow. Projecting a microphone focus point that is recording audio of a scene onto the plane of a video recording of the same scene to compute an audio display region within the recorded scene. Transmitting both the audio recording and the audio display region with the video recording. Computing an audio spot on the plane of a video display using the audio display region. Changing the audio, responsive to the selection of the audio spot.

Some embodiments of the present invention may include one, or more, of the following features, characteristics and/or advantages: (i) provide ways for live broadcasts to capture arrays of sound called "auxels," an analogy to "pixels" for video; (ii) instead of the sounds combining at a point in space to selectively create a single point of auditory experience corresponding to the scene on the screen, as with surround sound, the displayed scene itself becomes a selection space for various points of an auditory experience, controlled by the user; (iii) a way of manipulating the audio signal to give the viewer the illusion of having bionic ears to zoom in on one or more of these auxels using a pointing device like the intelligent remotes on smart TVs; (iv) an intuitive means for a viewer of a video feed or video recording to switch between a multiplicity of localized sound sources within the video according to their interest, or focus of attention, while viewing (these various sound sources in the video are referred to herein as "auxels"); (v) provide a method for allowing a viewer to rapidly and naturally switch between sound sources during the playback of a traditional video segment; (vi) augment the recording technique and devices using an array of adjustable parabolic microphones or other directional microphones that can focus on different points in a given space to create a set of auxels (audio-pixel elements); (vii) the stored auxel recordings from such an arrangement correspond to the sound sources in a three-dimensional (3D) space; (viii) dynamically map each 3D coordinate of the various sound sources onto a set of light sources in the 3D space that are computed to be the source of a given pixel value in a video feed; (ix) a method of mounting the microphones is to direct them outward in a convex semi-sphere in the direction of the video recording.

Some embodiments of the present invention may include one, or more, of the following features, characteristics and/or advantages: (i) compress the auxels in a audio display region as: (a) a single stream, (b) multiple audio streams may be played back as one, and/or (c) an algorithmic recovery of the different sources may be possible; (ii) a single operator may be able to control the direction of the microphones to enhance the immersed experience; (iii) process each different vantage point and/or video segment of separate audio sources as auxels in the edited stream of the final broadcast and/or recording such that crowd-sourcing is used during a video broadcast and/or recording to initialize a new viewer's experience to the most preferred auxel or set of auxels; (iv) the detection of a particular auxel's salience (for example, by user feedback identifying an auxel as highly relevant or important to the broadcast) actively guides current viewers of the broadcast to this auxel; (v) employ social listening in certain contexts where the task of monitoring different auxels in a transmission is shared among a group of viewers; (vi) the current number and identity of listeners listening to a given auxel is transmitted to: (a) other users of the system, (b) viewers of the broadcast, and/or (c) listeners of the broadcast; (vii) auxels in an emergency room or other "team" situation could allow remote observers a feeling of being to hear what each member of the team is saying; (viii) auxels in a classroom could allow remote observers to listen to particular students; (ix) auxels in video surveillance could make for finer-grained listening on conversations among shoppers; (x) auxels allow someone to understand better what is going on in busy, crowded situations, such as trading floors; (xi) auxels in entertainment can allow for immersive storylines that provide different experiences depending on the viewers choice of auxels; and/or (xii) LG Magic Motion is an example of one device that could be used for pointing to a "Smart TV" (Note: the term(s) "LG" and/or "Magic Motion" may be subject to trademark rights in various jurisdictions throughout the world and are used here only in reference to the products or services properly denominated by the marks to the extent that such trademark rights may exist).

Some embodiments of the present invention may include one, or more, of the following features, characteristics and/or advantages: (i) mobile phone touch screen that displays a video while viewers have headphones on is configured such that when the user touches part of the screen, the auxel(s) surrounding the touched area are activated (a touch to reset may play all sounds, mixed together, or a single sound); (ii) using a wand device, the viewer holds up the wand to point toward the video display such that when the wand is pointed toward a certain portion of the screen, the auxel(s) in the designated area are activated (pointing the wand away from the video display resets the selected auxel(s) to a default setting); (iii) a laser pointer may be directed toward the video display to cause the auxel(s) surrounding the indicated point to be activated (like the wand, pointing away from the display resets the selected auxel(s) to a default setting); (iv) eye tracking hardware is mounted on the video display in such a way that the gaze of the viewer's eye is used to select and/or activate auxels; (v) a camera is mounted on the video display and the video processor recognizes the head orientation of a viewer to activate corresponding auxels of interest; (vi) a tablet displays an enhanced video identifying the various sound sources such that they can be selected with a pointing device and/or finger to activate the appropriate auxel(s); (vii) present multiple objects in a given video scene that represent different sound sources and provide for selecting the objects within the scene to hear a sound made by or near the selected object; (viii) provide a method for viewer-selective control over the sound sources in a video to allow a viewer to rapidly and naturally switch between sound sources in a traditional video segment's playback using natural gestures; (ix) compute audio spots on the video recording or live broadcast to allow the user's selector to change the mix of different auxels using intuitive gestures; (x) apply to a video environment that includes audio playback capability, rather than simply a radio program environment where sound sources play according to where the user's head is pointing; (xi) for multiple video cameras recording different two dimensional planes, the three-dimensional audio is mapped to each plane such that: (a) the combined video feeds are transmitted together, or (b) the two-dimensional planes are presented one at a time; (xii) accounting for the view, as seen by the video camera, changing with time (for example, as the camera follows the action) the three-dimensional audio is mapped into the space being recorded on the video; (xiii) automatic construction of the 3D scene using multiple cameras.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Auxels: the time-varying recordings of a set of directional microphones in a 3-D space associated with a sound source in a space. An auxel may include display elements, or pixels, associated with the sound source itself.

Audio display region: an area (e.g., inside a circle) made up of one, or more, pixels on the plane of the video display (e.g., TV) that can be selected by a pointing device (e.g., mouse cursor controlled by remote). A point is transmitted and a default radius around it used, but, in some embodiments of the present invention, where the information is available, it is possible to transmit an approximate shape of the object that is the focus of the microphone as an audio display region.

What is claimed is:

1. A method comprising:

modifying a video recording by adding to the video recording a viewer-selectable region of a video display plane corresponding to a sub-set of pixels within a set of pixels displayed during playback of the video recording, the viewer-selectable region corresponding to a first sound source recorded by at least one microphone of a plurality of microphones from a three-dimensional scene; and adjusting an audio signal played by the modified video recording based, at least in part, upon selection of the viewer-selectable region during playback of the modified video recording;

wherein:

the at least one microphone records audio from the first sound source on an audio channel that is distinct from the audio channels of other microphones of the plurality of microphones; and selection of the viewer-selectable region plays an audio recording made by the at least one microphone corresponding to the first sound source.

2. The method of claim 1, wherein the step of modifying the video recording includes:
projecting a first audio focus point onto the video recording.

3. The method of claim 2, further comprising:
synchronizing, in the modified video recording, a set of video display frames and a corresponding first audio focus region to track an object associated with the first audio focus point.

4. The method of claim 1, further comprising:
determining a second audio focus point for a second microphone of the at least one microphones; and
wherein:
the modified first video further includes a second audio display region corresponding to at least the second audio focus point.

5. The method of claim 1, further comprising:
adjusting an audio signal played by the modified first video based, at least in part, upon a location of a cursor being within the first audio display region.

6. The method of claim 1, wherein the at least one microphone is directable to a plurality of individual sound sources.

7. The method of claim 1, wherein:
the first sound source is a physical object having a physical shape; and the first audio display region is shaped to match the physical shape of the first sound source.

8. A computer program product for providing viewer-selectable audio in a video, the computer program product comprising a computer readable storage medium having stored thereon:
program instructions programmed to modify a video recording by adding to the video recording a viewer-selectable region of a video display plane corresponding to a sub-set of pixels within a set of pixels displayed during playback of the video recording, the viewer-selectable region corresponding to a first sound source recorded by at least one microphone of a plurality of microphones from a three-dimensional scene; and
program instructions programmed to adjust an audio signal played by the modified video recording based, at least in part, upon selection of the viewer-selectable region during playback of the modified video recording;
wherein:
the at least one microphone records audio from the first sound source on an audio channel that is distinct from the audio channels of other microphones of the plurality of microphones; and
selection of the viewer-selectable region plays an audio recording made by the at least one microphone corresponding to the first sound source.

9. The computer program product of claim 8, wherein the modifying the video recording includes:
projecting a first audio focus point onto the video recording.

10. The computer program product of claim 9, further comprising:
program instructions programmed to synchronize, in the modified video recording, a set of video display frames and a corresponding first audio focus region to track an object associated with the first audio focus point.

11. The computer program product of claim 8, further comprising:
program instructions programmed to determine a second audio focus point for a second microphone of the at least one microphones; and
wherein:
the modified first video further includes a second audio display region corresponding to at least the second audio focus point.

12. The computer program product of claim 8, further comprising:
program instructions programmed to adjust an audio signal played by the modified first video based, at least in part, upon a location of a cursor being within the first audio display region.

13. The computer program product of claim 8, wherein the at least one microphone is directable to a plurality of individual sound sources.

14. The computer program product of claim 8, wherein:
the first sound source is a physical object having a physical shape; and the first audio display region is shaped to match the physical shape of the first sound source.

15. A computer system for providing viewer-selectable audio in a video, the computer system comprising:
a processor(s) set; and
a computer readable storage medium;
wherein:
the processor set is structured, located, connected, and/or programmed to run program instructions stored on the computer readable storage medium; and
the program instructions include:
program instructions programmed to modify a video recording by adding to the video recording a viewer-selectable region of a video display plane corresponding to a sub-set of pixels within a set of pixels displayed during playback of the video recording, the viewer-selectable region corresponding to a first sound source recorded by at least one microphone of a plurality of microphones from a three-dimensional scene; and
program instructions programmed to adjust an audio signal played by the modified video recording based, at least in part, upon selection of the viewer-selectable region during playback of the modified video recording;
wherein:
the at least one microphone records audio from the first sound source on an audio channel that is distinct from the audio channels of other microphones of the plurality of microphones; and
selection of the viewer-selectable region plays an audio recording made by the at least one microphone corresponding to the first sound source.

16. The computer system of claim 15, wherein the modifying the video recording includes:
projecting a first audio focus point onto the video recording.

17. The computer system of claim 15, further comprising:
program instructions programmed to determine a second audio focus point for a second microphone of the at least one microphones; and
wherein:
the modified first video further includes a second audio display region corresponding to at least the second audio focus point.

18. The computer system of claim 15, further comprising:
program instructions programmed to adjust an audio signal played by the modified first video based, at least in part, upon a location of a cursor being within the first audio display region.

19. The computer system of claim 15, wherein the at least one microphone is directable to a plurality of individual sound sources.

20. The computer system of claim 15, wherein:
the first sound source is a physical object having a physical shape; and the first audio display region is shaped to match the physical shape of the first sound source.

* * * * *